(12) United States Patent
Samuelsson et al.

(10) Patent No.: US 11,832,583 B2
(45) Date of Patent: Dec. 5, 2023

(54) MILKING APPARATUS, AND A MILKING PLANT

(71) Applicant: DELAVAL HOLDING AB, Tumba (SE)

(72) Inventors: David Samuelsson, Tumba (SE); Joonatan Skoog, Tumba (SE)

(73) Assignee: DeLaval Holding AB, Tumba (SE)

(*) Notice: Subject to any disclaimer, the term of this patent is extended or adjusted under 35 U.S.C. 154(b) by 34 days.

(21) Appl. No.: 17/288,405

(22) PCT Filed: Oct. 21, 2019

(86) PCT No.: PCT/SE2019/051029
§ 371 (c)(1),
(2) Date: Apr. 23, 2021

(87) PCT Pub. No.: WO2020/085977
PCT Pub. Date: Apr. 30, 2020

(65) Prior Publication Data
US 2021/0378205 A1 Dec. 9, 2021

(30) Foreign Application Priority Data
Oct. 25, 2018 (SE) .................................. 1800202-2

(51) Int. Cl.
*A01J 5/017* (2006.01)
*A01J 5/007* (2006.01)
*A01J 5/16* (2006.01)

(52) U.S. Cl.
CPC ............ *A01J 5/0175* (2013.01); *A01J 5/007* (2013.01); *A01J 5/16* (2013.01)

(58) Field of Classification Search
CPC ............. A01J 5/0175; A01J 5/007; A01J 5/16
See application file for complete search history.

(56) References Cited

U.S. PATENT DOCUMENTS 3,929,103 A 12/1975 Schluckbier
3,991,716 A 11/1976 Reisgies
(Continued)

FOREIGN PATENT DOCUMENTS

EP 2 717 677 4/2014
SE 521 964 12/2003
(Continued)

OTHER PUBLICATIONS

Swedish Search Report for SE Application No. 1800202-2 dated Oct. 25, 2018, 3 pages.
(Continued)

*Primary Examiner* — Joshua D Huson
*Assistant Examiner* — Alanna K Peterson
(74) *Attorney, Agent, or Firm* — NIXON & VANDERHYE

(57) ABSTRACT

The milking apparatus includes a cluster (4) connected to a retraction line (10), and a cylinder (11) having a piston (13) being movable between first and second end positions. The piston acts on the retraction line to move the cluster to a retracted rest position when moved to the second end position, and to permit the cluster to be moved to an active milking position when the piston is in the first end position. A switch device (30) may alternate between a first state and a second state. The retraction line permits the switch device to change from the first state to the second state when a movement of the cluster from the retracted rest position is initiated. The switch device initiates in the second state supply of a pressurized medium to the cylinder to force the piston to the first end position.

17 Claims, 4 Drawing Sheets

(56) References Cited

U.S. PATENT DOCUMENTS

| | | | |
|---|---|---|---|
| 4,188,910 A | 2/1980 | Hocker | |
| 4,408,564 A | 10/1983 | Flocchini | |
| 4,586,462 A * | 5/1986 | Icking | A01J 5/017 |
| | | | 119/14.13 |
| 5,379,722 A | 1/1995 | Larson | |
| 5,809,931 A | 9/1998 | Ellis et al. | |
| 6,213,051 B1 * | 4/2001 | Fransen | A01J 5/0175 |
| | | | 119/14.08 |
| 6,240,878 B1 * | 6/2001 | Larson | A01J 5/017 |
| | | | 119/14.08 |
| 7,938,082 B2 | 5/2011 | Stolte et al. | |
| 2007/0261640 A1 | 11/2007 | Stolte et al. | |
| 2012/0312237 A1 | 12/2012 | Hansen et al. | |
| 2013/0074775 A1 * | 3/2013 | Andersson | A01J 5/0175 |
| | | | 119/14.08 |
| 2014/0041591 A1 * | 2/2014 | Krone | A01J 5/017 |
| | | | 119/14.08 |

FOREIGN PATENT DOCUMENTS

| | | | |
|---|---|---|---|
| WO | WO-2012126502 A1 * | 9/2012 | A01J 5/00 |
| WO | 2012/170293 | 12/2012 | |
| WO | 2017/213577 | 12/2017 | |

OTHER PUBLICATIONS

International Search Report for PCT/SE2019/051029 dated Dec. 20, 2019, 4 pages.
Written Opinion of the ISA for PCT/SE2019/051029 dated Dec. 20, 2019, 6 pages.

* cited by examiner

MILKING APPARATUS, AND A MILKING PLANT

This application is the U.S. national phase of International Application No. PCT/SE2019/051029 filed Oct. 21, 2019 which designated the U.S. and claims priority to SE Patent Application No. 1800202-2 filed Oct. 25, 2018, the entire contents of each of which are hereby incorporated by reference.

TECHNICAL FIELD OF THE INVENTION

The present invention refers to a milking apparatus according to the preamble of claim 1. The invention also refers to a milking plant comprising a plurality of milking places.

BACKGROUND AND PRIOR ART

When milking animals in large milking plants on an industrial scale, a rotary platform is frequently used. The rotary platform may house a large number of animals, typically more than 100 animals, which are milked during the rotation of the platform. The platform thus has a corresponding number of milking places, each provided with a milking apparatus comprising a milking cluster with four teatcups to be attached to the teats of the animal to be milked.

In such large milking plants, the milking cluster is normally held and suspended by a chain in a retracted rest position when not used for milking.

When a milking operation is to be terminated, the application of the milking vacuum to the milking cluster is interrupted and a pulling force is applied to the chain in order to retract the milking cluster and the teatcups from the teats, typically by means of a hydraulic cylinder coupled to the chain, to a retracted rest position.

When a milking operation is to be started, the operator initially has to press a button provided anywhere in the proximity of the milking place in order to permit the hydraulic cylinder to release the chain and the milking cluster from the retracted rest position. The operator may then manually grip the milking cluster and attached the teatcups to the teats of the animal.

WO 2017/213577 discloses a milking cylinder unit comprising; a cylinder, a piston, displaceably arranged in the cylinder, a flexible element, in the form of a cord or a wire, connected to the piston and in one end connected to a milking cluster. In a non-active position of the cluster, the cluster by its own weight generates a pulling force on the flexible element, and at least one sensing element. The sensing element is arranged to detect a relief of the pulling force on the flexible element to trigger displacement of the piston in the cylinder. The sensing element comprises a redirecting member by which the flexible element is supported and redirected. The flexible element applies a force on the redirecting member as a result of the pulling force generated thereon by the cluster, and said redirecting member is separate from the piston and arranged along the path of the flexible element between the piston and the end connected to the cluster.

EP 2 717 677 discloses a system including a cylinder and a piston. The piston is positioned within the cylinder and operable to move within the cylinder from a retracted position to an extended position. A vacuum port facilitates application of a vacuum pressure to the cylinder, the vacuum pressure resulting in a vacuum force being applied to the piston, the vacuum force causing the piston to move toward the retracted position. A spring member is configured to apply a spring force to the piston when the piston is in the retracted position, the spring force offsetting at least a portion of the vacuum force. A sensor is operable to generate a displacement signal in response to detecting movement of the piston from the retracted position toward the extended position.

U.S. Pat. No. 7,938,082 discloses a milking machine cylinder comprising a flexible element, in the form of a rope or a chain, and at least one sensor element which detects at least a substantial weight relief of the flexible element in order to trigger a start signal for a milking process.

SUMMARY OF THE INVENTION

The purpose of the present invention is to provide an improved milking apparatus suitable for large milking plants of the kind described above. In particular, it is aimed at a secure and safe release of the milking cluster from the retracted rest position. Furthermore, it is aimed at a simplified initiating of said release of the milking cluster. Still further, it is aimed at a simple and robust switch device for initiating the release of the milking cluster and starting the milking vacuum in an automatic manner.

This purpose is achieved by the milking apparatus initially defined, which is characterized in that the first chamber part is closed and connectable to a device providing a pressurized medium, the second chamber part is closed and connectable to said device, and the switch device in the second state initiates supply of the pressurized medium from said device to the second chamber part, thereby forcing the piston to move to the first end position.

The cylinder may thus, when the switch device is in the second state, in a secure manner move the piston to the first end position, in which the milking cluster is permitted to be moved to the active milking position by an operator.

The milking cluster may in the retracted rest position hang down by gravity, wherein the retraction line may be provided to permit the switch device to change from the first state to the second state when lifting of the milking cluster from the retracted rest position is initiated by an operator.

According to an embodiment of the invention, the cylinder comprises a piston rod attached to the piston and extending through a first end piece of the cylinder, wherein the first end piece is provided at and closes the first end of the cylinder chamber, wherein a pulley is attached to an outer end of the piston rod outside the cylinder chamber and wherein an intermediate portion of the retraction line runs around the pulley. Thanks to this configuration, the retraction line and the pulley will always be located outside the cylinder chamber. This secures a reliable functioning of the milking apparatus.

According to an embodiment of the invention, the pulley is journaled on a slide element attached to the outer end of the piston rod and supported by a guide surface. The guide surface supporting the slide element with the pulley, further improves the rigidity and reliability of the milking apparatus. The cylinder may act on the pulley and the retraction line which are forced to follow a determined path back and forth.

According to an embodiment of the invention, the guide surface extends from the cylinder, in particular from a first end piece of the cylinder, in parallel with the longitudinal axis. The guide surface may thus offer support for the pulley, or the pulley and the slide element, along the full movement of the pulley.

According to an embodiment of the invention, the guide surface may be formed by means of a longitudinal plate. The cylinder and the longitudinal plate may be attached to each other.

According to an embodiment of the invention, the retraction line has a first end attached to the switch device and a second end attached to the milking cluster. The intermediate portion may extend between the first end and the second end of the retraction line, which thus makes one, and advantageously only one turn, around the pulley. The turn may be 180°, or approximately 180°.

According to an embodiment of the invention, the retraction line comprises, or consists of, a chain. A chain, in particular a chain of metallic material, constitutes a strong and reliable retraction line which may resist a durable handling with frequent attachments and retractions of the milking cluster.

According to an embodiment of the invention, the switch device is provided at a distance from the cylinder, wherein said distance is longer than the distance between the first and the second end positions of the piston. The piston may thus be separated from the cylinder, and thus the switch device and the cylinder are both easily accessible for maintenance.

According to an embodiment of the invention, the switch device comprises a switch and a tilting element having a first portion attached to the retraction line and a second portion acting on the switch.

According to an embodiment of the invention, the first portion has a greater weight than the second portion.

According to an embodiment of the invention, the tilting element is tilting around a swing axis located between the first portion and the second portion. The tilting element may thus have a simple configuration and may be tiltable around the swing axis by means of gravity. No further means, such as one or more springs, are needed to tilt the tilting element to change the state of the switch device. The swing axis may extend perpendicular to the longitudinal axis.

According to an embodiment of the invention, the second portion in the second state of the switch device is tilted towards or against the switch by means of gravity, and in the first state of the switch device is tilted away from the switch by a pulling force of the retraction line and the piston of the cylinder.

According to an embodiment of the invention, the switch comprises a proximity sensor. A magnet, such as a permanent magnet may be provided on the second portion.

According to an embodiment of the invention, the switch device communicates with a control unit to transfer a signal to the control unit when the switch device has reached the second state, wherein the control unit is configured to initiate said supply of the pressurized medium from said device to the second chamber part.

According to an embodiment of the invention, the milking apparatus comprises a vacuum source configured to provide a milking vacuum to the milking cluster and the teatcups, wherein application of the milking vacuum to the milking cluster is initiated by the control unit upon receipt of said signal from the switch device.

According to an embodiment of the invention, the cylinder via the retraction line is provided to move the switch device from the second state to the first state when the milking cluster is moved from the active milking position to the retracted rest position.

The purpose is also achieved by the milking plant initially defined wherein each milking place comprises a milking apparatus as described above. The milking plant may comprise a rotary platform.

BRIEF DESCRIPTION OF THE DRAWINGS

The invention is now to be explained more closely through a description of various embodiments and with reference to the drawings attached hereto.

DETAILED DESCRIPTION OF VARIOUS EMBODIMENTS OF THE INVENTION

Figure 1:
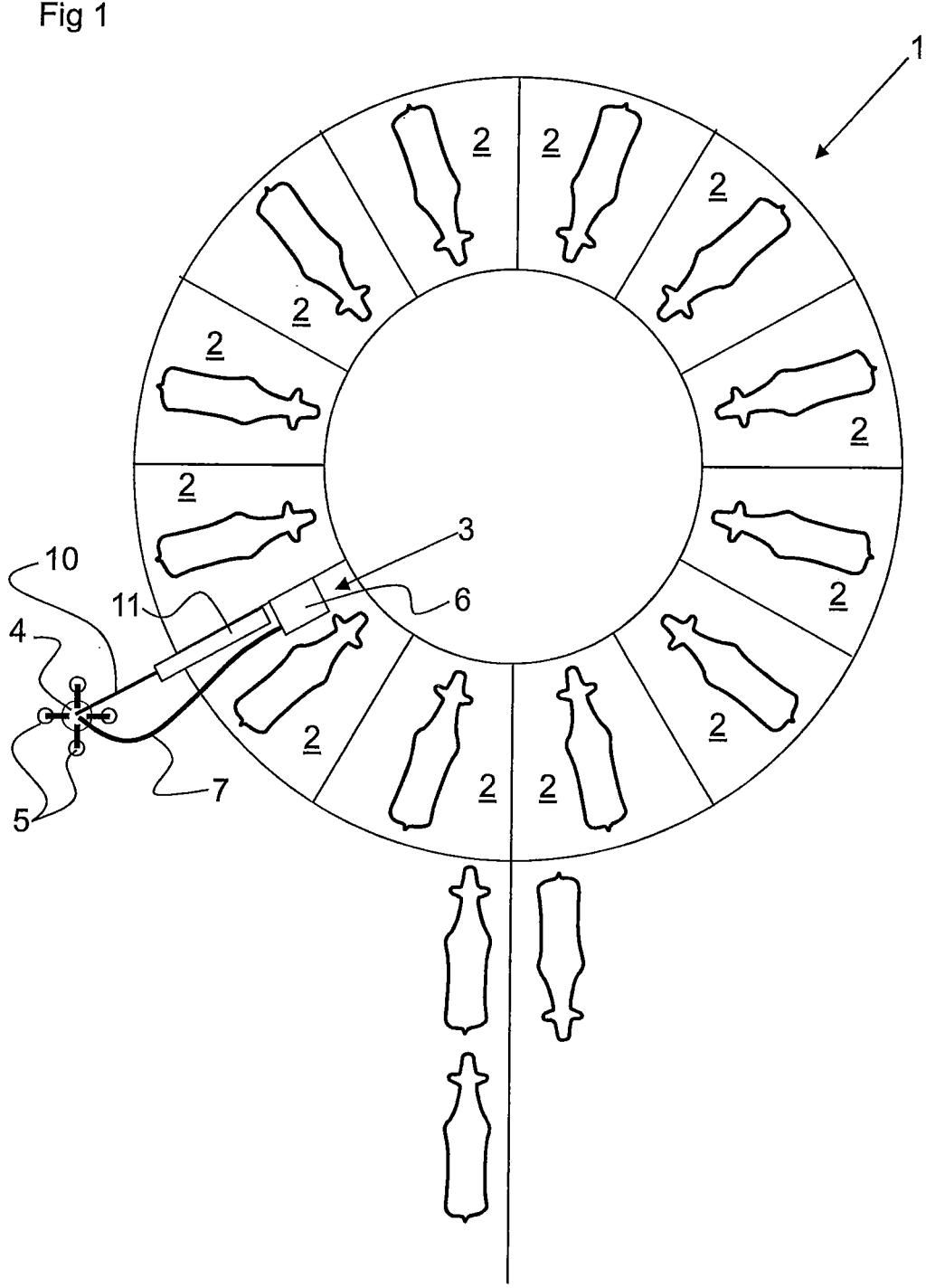
FIG. 1 discloses schematically a view from above of a milking plant.

FIG. 1 discloses a milking plant, and more specifically a rotary platform 1, comprising a number of milking places 2 each housing an animal to be milked. The rotary platform 1 of FIG. 1 is disclosed with a relatively small number of milking places 2, but it should be noted that the invention is applicable to milking plants, especially rotary platforms 1, comprising a very large number of milking places 2, for instance more than 100 milking places 2.

Each milking place 2 comprises a milking apparatus 3 although only one milking apparatus 3 is disclosed in FIG. 1. Each milking apparatus 3 comprises a milking cluster 4 having a plurality of teatcups 5, for instance two or four teatcups 5, to be attached to the animal to be milked. The milking cluster 4 and the teatcups 5 are connected to a vacuum source, schematically indicated at 6, for supply of milking vacuum and pulsation vacuum to the milking cluster 4 and the teatcups 5 via a bundle 7 of milk and pulse lines in a manner known per se.

The milking apparatus 3 also comprises a retraction line 10 connected to the milking cluster 4. In the embodiments disclosed, the retraction line 10 comprises a chain, especially a chain of metallic material, such as stainless steel.

Furthermore, the milking apparatus 3 also comprises a cylinder 11. The cylinder 11 is disclosed more closely in FIGS. 2, 3 and 4.

The cylinder 11 comprises an elongated cylinder chamber 12 having a first end 12a and a second end 12b. The cylinder 11 also comprises a piston 13 being movable back and forth in the cylinder chamber 12 along a longitudinal axis x to a first end position adjacent to a first end 12a and to a second end position adjacent to a second end 12b.

The cylinder chamber 12 forms a first chamber part 12' between the piston 13 and the first end 12a and a second chamber part 12" between the piston 13 and the second end 12b. The first chamber part 12' is closed. The second chamber part 12" is closed.

Figure 2:
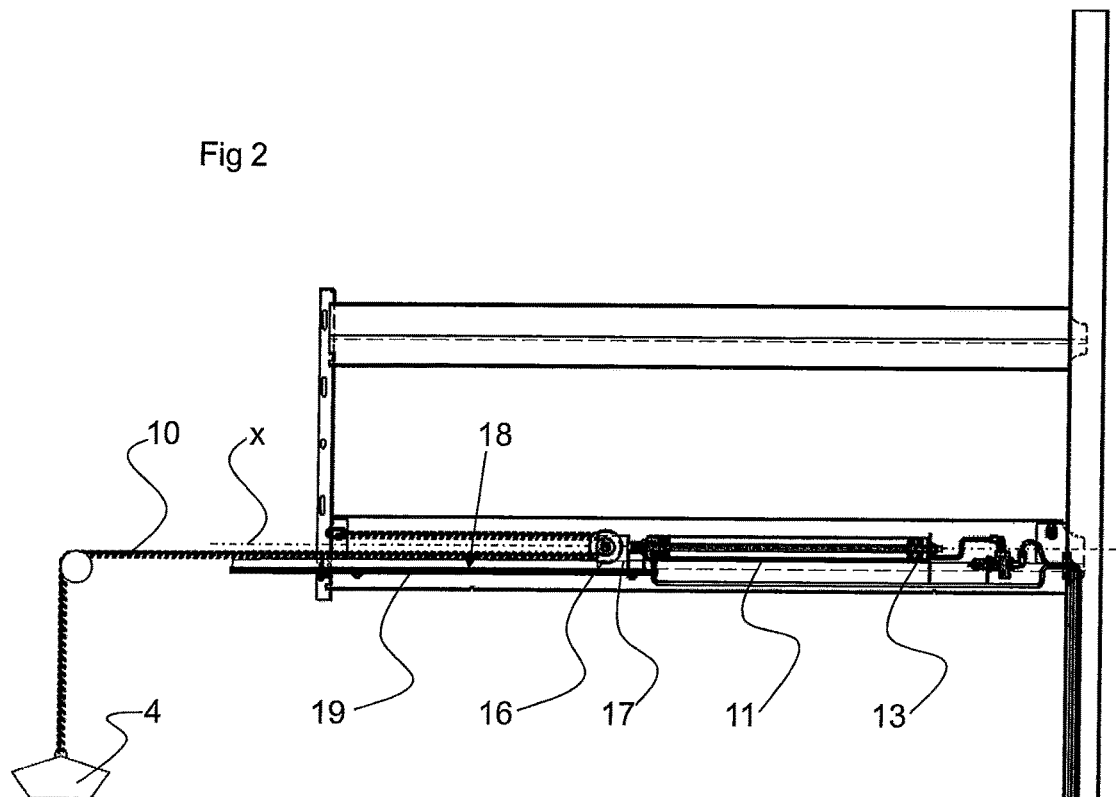
FIG. 2 discloses schematically a partly sectional side view of a part of a milking apparatus of the milking plant.

The piston 13 is provided to act on the retraction line 10 to move the milking cluster 4 to a retracted rest position, shown in FIG. 2, when piston 13 is moved to the second end position adjacent the second end 12b, and to permit the milking cluster 4 to be moved to an active milking position when the piston 13 is in the first end position adjacent the first end 12a.

Figure 3:
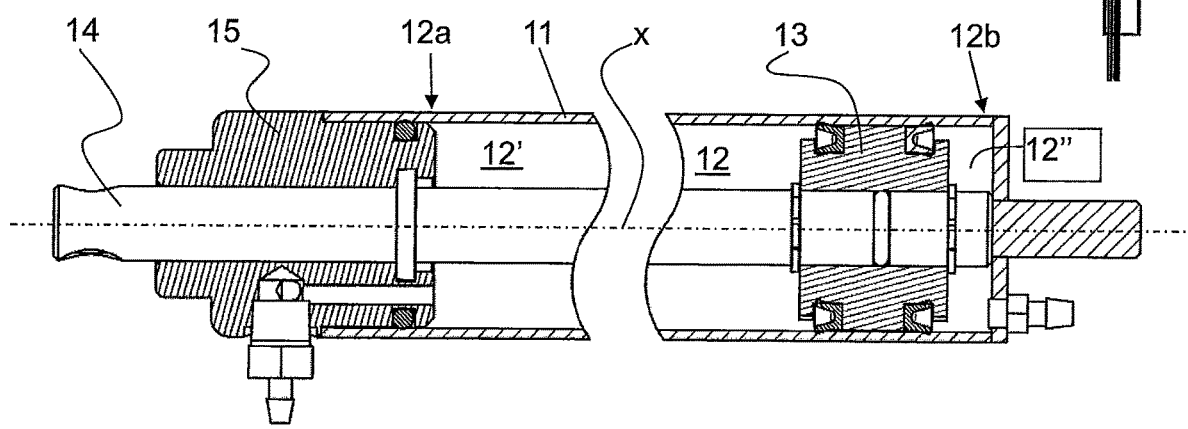
FIG. 3 discloses schematically a sectional view of a cylinder of the milking apparatus.

The cylinder 11 also comprises a piston rod 14, which is attached to the piston 13 and extends through a first end piece 15 of the cylinder 11. The first end piece 15 is provided at and closes the first end 12a of the cylinder chamber 12, as can be seen in FIG. 3.

The milking apparatus 3 also comprises a rotatable pulley 16 and a slide element 17. The slide element 17 is attached to an outer end of the piston rod 14 outside the cylinder chamber 12. The pulley 16 is journaled on the slide element 17.

The pulley 16 is thus, in each position, located at a distance, or significant distance, from the first end piece 15 and from the first end 12a of the cylinder chamber 12.

An intermediate portion of the retraction line 10 runs around the pulley 16, as can be seen in FIG. 2.

The slide element 17, which is attached to the outer end of the piston rod 14, is supported by a guide surface 18. The guide surface 18 extends from the first end piece 15 of the cylinder 11 in parallel with the longitudinal axis x.

The guide surface 18 may be formed by means of a longitudinal plate 19, see FIG. 2. The cylinder 11 and the longitudinal plate 19 may be attached to each other.

Figure 4:
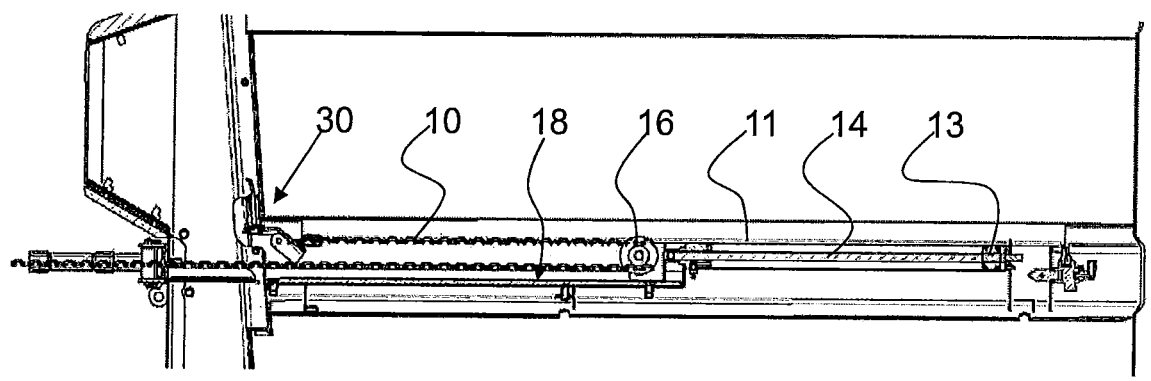
FIG. 4 discloses schematically a partly sectional side view of a part of a milking apparatus of the milking plant similar to FIG. 2 but showing a switch device.
Figure 5:
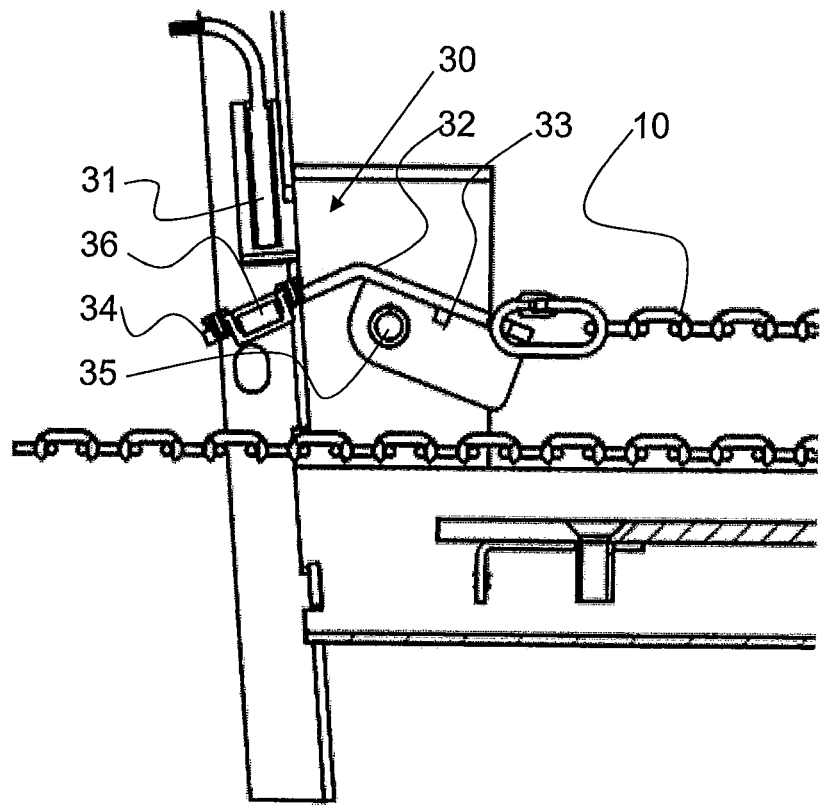
FIG. 5 discloses schematically the switch device in a first state.
Figure 6:
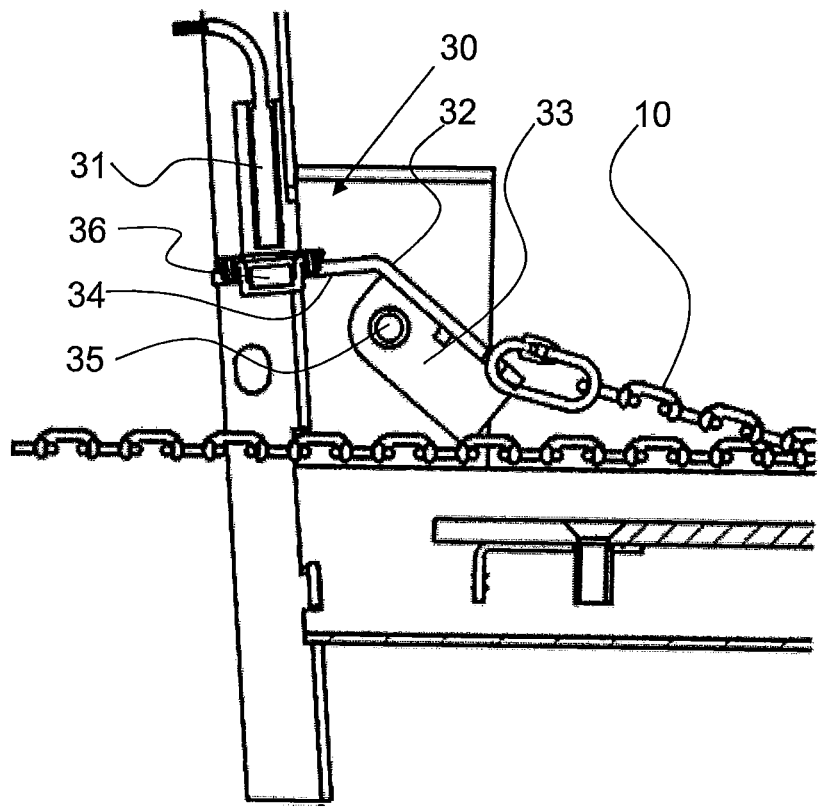
FIG. 6 discloses schematically the switch device in a second state.

The milking apparatus 3 also comprises a switch device 30, see FIGS. 4-6, which is configured to alternate between a first state, see FIG. 5, and a second state, see FIG. 6. The retraction line 10 is provided to act on the switch device 30 to permit the switch device 30 to change from the first state to the second state when a relieving movement of the milking cluster 4 from the retracted rest position is initiated.

When the milking cluster 4 is in the retracted rest position, see FIG. 2, it may hang down by gravity, wherein the retraction line 10 is tensioned. The retraction line 10 may then permit the switch device 30 to change from the first state, see FIG. 5, to the second state, see FIG. 6, when lifting of the milking cluster 4 from the retracted rest position is initiated by an operator, i.e. when the tensioning of the retraction line 10 is relieved.

The retraction line 10 has a first end, which is attached to the switch device 30, see FIGS. 4-6, and a second end, which is attached to the milking cluster 4, see FIG. 2.

The switch device 30 is provided outside and at a distance from the cylinder 11. Said distance is longer than the distance between the first end and the second end positions of the piston 13 in the cylinder chamber 12.

The switch device 30 comprises a switch 31 and a tilting element 32. The tilting element 32 has a first portion 33 attached to the retraction line 10 and a second portion 34 acting on the switch 31. The first portion 33 has a greater weight than the second portion 34.

The tilting element 32 is tilting around a swing axis 35 located between an extension of the first portion 33 and the second portion 34. The tilting element 32 may thus have a simple configuration and may be tilted around the swing axis 35 by means of gravity only. The swing axis 35 may be perpendicular to the longitudinal axis x.

The second portion 34 is, in the second state of the switch device 30 when the retraction line 10 is relieved, tilted towards or against the switch 31 by means of gravity, see FIG. 6, thanks to the greater weight of the first portion 33. In the first state of the switch device 30 when the retraction line 10 is tensioned, the second portion 34 tilted away from the switch 31 by means of the pulling force of the retraction line 10 and the piston 13 of the cylinder 11.

The switch 31 may comprise a proximity sensor. The second portion 34 may comprise a permanent magnet 36 to cooperate with the switch 31.

Figure 7:
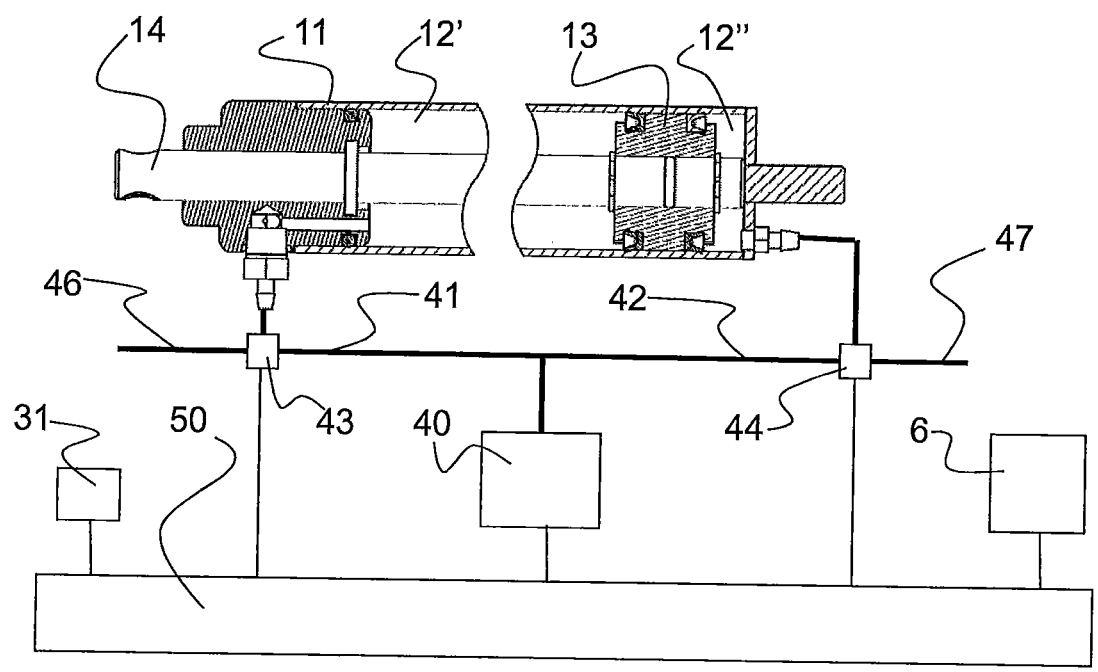
FIG. 7 discloses schematically a view of the cylinder and further parts of the milking apparatus.

The milking apparatus also comprises a device 40 providing a pressurized medium, see FIG. 7. The device 40 may for instance comprise a compressor providing pressurized air. The first chamber part 12' and the second chamber part 12" are connectable to the device 40 via a respective conduit 41 and 42.

Each of the conduits 41, 42 comprises a valve 43, 44. Each of the valves 43, 44 are alternatively openable for flow of the pressurized medium from the device 40 to the respective chamber part 12', 12" or openable for a flow of the pressurized medium from the respective chamber part 2', 12" to the atmosphere via a respective venting conduit 46, 47.

Furthermore, the milking apparatus 3 comprises a control unit 50, or communicates with an overall control unit 50 for the milking plant 1. The control unit 50 communicates with the switch 31 of the switch device 30, the device 40, the valves 43, 44 and also with the vacuum source 6.

When the switch device 30 is in the second state it may initiate, via the control unit 50, supply of the pressurized medium from the device 40 to the second chamber part 12" by opening the valve 44 to a flow of the pressurized medium from the device 40 to the second chamber part 12" via the conduit 42. At the same time the valve 43 is opened to permit a flow of the pressurized medium from the first chamber part 12' to the atmosphere via the venting conduit 46. The piston 13 will thus be moved to the first end position.

Thus, the switch device 30 communicates with the control unit 50 to transfer a signal to the control unit 50 when the switch device 30 has reached the second state, and then the control unit 50 may initiate said supply of the pressurized medium from the device 40 to the second chamber part 12" as explained above.

In addition, the control unit 50 may initiate application of the milking vacuum to the milking cluster 4 and the teatcups 5 from the vacuum source 6 upon receipt of said signal from the switch device 30.

Consequently, when the operator lifts the milking cluster 4 slightly from the retracted rest position, the retraction line 10 is relieved and the switch device 30 will be moved to the second state. The switch 31 will generate said signal and communicate the signal to the control unit, 50 which then may move the piston 13 to the first end position, whereafter the teatcups 5 may be attached to the teats of the animal and the milking vacuum may be applied to the teatcups 5.

When the switch device 30 is in first state said signal is not generated and thus not communicated to the control unit 50. The control unit 50 may then, when the milking operation is to be interrupted, initiate supply of the pressurized medium from the device 40 to the first chamber part 12' by opening the valve 43 to a flow of the pressurized medium from the device 40 to the first chamber part 12' via the conduit 41. At the same time, the valve 44 is opened to permit a flow of the pressurized medium form the second chamber part 12" to the atmosphere via the venting conduit 47. The piston 13 may thus be moved to the second end position. Because of this movement of the piston 13, the flexible line 10 may be tensioned and may move the switch device 30 from the second state, shown in FIG. 6, to the first state, shown in FIG. 5, i.e. when the milking cluster 5 is moved from the active milking position to the retracted rest position.

The present invention is not limited to the embodiments disclosed, but may be varied and modified within the scope of the following claims.

The invention claimed is:

1. A milking apparatus (3) comprising:
 a milking cluster (4) having a plurality of teatcups (5) to be attached to an animal to be milked;

a retraction line (10) having a first end and a second end, the second end connected to the milking cluster (4);

a cylinder (11) comprising an elongated cylinder chamber (12) and a piston (13) being movable back and forth in the cylinder chamber (12) along a longitudinal axis (x) to a first end position adjacent to a first end (12*a*) of the cylinder chamber (12), and to a second end position adjacent to a second end (12*b*) of the cylinder chamber (12), wherein the cylinder chamber (12) forms a first chamber part (12') between the piston (13) and the first end (12*a*) and a second chamber part (12") between the piston (13) and the second end (12*b*), and wherein the piston (13) is configured to act on the retraction line (10) to move the milking cluster (4) to a retracted rest position when the piston (13) is moved to the second end position, and to permit the milking cluster (4) to be moved to an active milking position when the piston (13) is in the first end position; and a switch device (30) comprising a switch (31) and a tilting element (32) having a first portion (33) with an end attached to the first end of the retraction line (10) and a second portion (34) with an end acting on the switch (31), wherein the switch device (30) is configured to alternate between a first state and a second state, the second portion (34) being tiltable towards and away from the switch (31) between a first position having a first inclination with respect to the switch (31) and a second position having a second inclination with respect to the switch (31), the second inclination being different from the first inclination, wherein the first end of the retraction line (10) is attached to the end of the first portion of the tilting element to cause the switch device (30) to change, by tilting of the tilting element (32) between the first and second positions, from the first state to the second state when a movement of the milking cluster (4) from the retracted rest position is initiated, wherein, the first chamber part (12') is closed and connectable to a device (40) providing a pressurized medium, the second chamber part (12") is closed and connectable to said device (40), the second chamber part (12") being configured to receive a supply of the pressurized medium from said device (40), and the switch device (30) in the second state is configured to initiate the supply of the pressurized medium from said device (40) to the second chamber part (12"), the pressurized medium thereby forcing the piston (13) to move to the first end position.

2. The milking apparatus (3) according to claim 1, wherein the cylinder (11) comprises a piston rod (14) attached to the piston (13) and extending through a first end piece (15) of the cylinder (11), wherein the first end piece (15) is provided at and closes the first end (12*a*) of the cylinder chamber (12), wherein a pulley (16) is attached to an outer end of the piston rod (14) outside the cylinder chamber (12) and wherein an intermediate portion of the retraction line (10) runs around the pulley (16).

3. The milking apparatus (3) according to claim 2, wherein the pulley (16) is journaled on a slide element (17) attached to the outer end of the piston rod (14) and supported by a guide surface (18).

4. The milking apparatus (3) according to claim 3, wherein the guide surface (18) extends from the cylinder (11) in parallel with the longitudinal axis (x).

5. The milking apparatus (3) according to claim 1, wherein the retraction line (10) has a first end attached to the switch device (30) and a second end attached to the milking cluster (4).

6. The milking apparatus (3) according to claim 1, wherein the retraction line (10) comprises a chain.

7. The milking apparatus (3) according to claim 1, wherein the switch device (30) is provided at a distance from the cylinder (11) and wherein said distance is longer than the distance between the first and the second end positions of the piston (13).

8. The milking apparatus (3) according to claim 1, wherein the first portion (33) has a greater weight than the second portion (34).

9. The milking apparatus (3) according to claim 8, wherein the switch device (30) further comprises a swing axis (35) located between an extension of the first portion (33) and the second portion (34), and the tilting element (32) is tiltable around the swing axis (35).

10. The milking apparatus (3) according to claim 9, wherein the second portion (34) in the second state of the switch device (30) is tilted towards or against the switch (31) by gravity, and in the first state of the switch device (30) is tilted away from the switch (31).

11. The milking apparatus (3) according to claim 1, wherein the switch (31) comprises a proximity sensor.

12. The milking apparatus (3) according to claim 1, further comprising a control unit (50), wherein the switch device (30) communicates with the control unit (50) to transfer a signal to the control unit (50) when the switch device (30) has reached the second state, and wherein the control unit (50) is configured to initiate said supply of the pressurized medium from said device (40) to the second chamber part (12").

13. The milking apparatus (3) according to claim 12, wherein the milking apparatus (3) comprises a vacuum source (6) configured to provide a milking vacuum to the milking cluster (4) and the teatcups (5), and wherein application of the milking vacuum to the milking cluster (4) is initiated by the control unit (50) upon receipt of said signal from the switch device (30).

14. The milking apparatus (3) according to claim 1, wherein the cylinder via the retraction line (10) is provided to move the switch device (30) from the second state to the first state when the milking cluster (5) is moved from the active milking position to the retracted rest position.

15. A milking plant comprising a plurality of milking places (2), wherein each milking place (2) comprises a milking apparatus (3) according to claim 1.

16. The milking apparatus (3) according to claim 1, wherein, the tilting element (32) is tiltable around a swing axis, in the second state of the switch device (30) when the retraction line (10) is relieved, the second portion (34) is tilted towards or against the switch (31) by gravity, and in the first state of the switch device (30) when the retraction line (10) is tensioned, the second portion (34) is tilted away from the switch (31) by a pulling force of the retraction line (10) and the piston (13) of the cylinder (11).

17. The milking apparatus (3) according to claim 1, wherein, the switch (31) is configured to generate a signal when the switch device (30) is moved into the second state to thereby initiate the supply of the pressurized medium from said device (40) to the second chamber part (12"), the pressurized medium thereby forcing the piston (13) to move to the first end position, and
said switch (31) is configured not to generate the signal when the switch device (30) is in the first state.

\* \* \* \* \*